(12) United States Patent
Tang (10) Patent No.: US 9,019,444 B2
(45) Date of Patent: Apr. 28, 2015

(54) EDGE-TYPE BACKLIGHT MODULE AND LIQUID CRYSTAL DISPLAY USING THE SAME

(75) Inventor: Guofu Tang, Guangdong (CN)

(73) Assignee: Shenzhen China Star Optoelectronics Technology Co., Ltd., Shenzhen, Guangdong (CN)

(*) Notice: Subject to any disclaimer, the term of this patent is extended or adjusted under 35 U.S.C. 154(b) by 326 days.

(21) Appl. No.: 13/574,081

(22) PCT Filed: May 26, 2012

(86) PCT No.: PCT/CN2012/076131
§ 371 (c)(1),
(2), (4) Date: Jul. 19, 2012

(87) PCT Pub. No.: WO2013/143225
PCT Pub. Date: Oct. 3, 2013

(65) Prior Publication Data
US 2013/0258247 A1    Oct. 3, 2013

(30) Foreign Application Priority Data
Mar. 27, 2012  (CN) .......................... 2012 1 0084426

(51) Int. Cl.
G02F 1/1335  (2006.01)
G02F 1/1333  (2006.01)
F21V 7/04  (2006.01)
F21V 8/00  (2006.01)

(52) U.S. Cl.
CPC ............ G02B 6/0083 (2013.01); G02B 6/0023 (2013.01); G02B 6/0031 (2013.01)

(58) Field of Classification Search
CPC .................. G02F 1/133603; G02F 1/133605; G02F 1/133606; G02F 1/133615; G02B 6/0023; G02B 6/0031; G02B 6/0073; G02B 6/0091

USPC ................... 349/65, 110; 362/612, 622–624, 362/631–634
See application file for complete search history.

(56) References Cited

U.S. PATENT DOCUMENTS 6,717,559 B2 *  4/2004  Weindorf ......................... 345/82
7,083,317 B2 *  8/2006  Higashiyama ................ 362/612
7,530,723 B2 *  5/2009  Ohno ............................ 362/613
(Continued)

FOREIGN PATENT DOCUMENTS

CN           1892345    *  1/2007  .............. G02F 1/133
CN         201110928       9/2008
(Continued)

*Primary Examiner* — Paisley L Arendt
(74) *Attorney, Agent, or Firm* — Muncy, Geissler, Olds & Lowe, P.C.

(57) ABSTRACT

An edge-type backlight module and a liquid crystal display using the same. The edge-type backlight module comprising a printed circuit board having a supporting surface; plural light emitting diodes disposed on the supporting surface, each of the light emitting diodes comprising a light emitting surface and the light emitted by the light emitting diode being emitted from the light emitting surface; a reflective film disposed on the supporting surface; a light guide plate disposed above the reflective film so that the reflective film being disposed between the light guide plate and the supporting surface; a reflective surface disposed on a side edge of the light guide plate and kept a distance from the light emitting diode, the reflective surface used for reflecting the light emitted from the light emitting surface; and a dark surface disposed on the supporting surface for absorbing the light reflected by the reflective surface.

9 Claims, 5 Drawing Sheets

(56) References Cited

U.S. PATENT DOCUMENTS

| | | | | |
|---|---|---|---|---|
| 8,064,007 | B2 * | 11/2011 | Mo et al. | 349/58 |
| 8,152,354 | B2 * | 4/2012 | Hong et al. | 362/630 |
| 8,773,617 | B2 * | 7/2014 | Choi et al. | 349/65 |
| 2012/0099341 | A1 * | 4/2012 | Kwon et al. | 362/612 |

FOREIGN PATENT DOCUMENTS

| | | |
|---|---|---|
| CN | 201203734 | 3/2009 |
| CN | 201954400 | 8/2011 |

* cited by examiner

EDGE-TYPE BACKLIGHT MODULE AND LIQUID CRYSTAL DISPLAY USING THE SAME

FIELD OF THE INVENTION

The present invention relates to an edge-type backlight module and a liquid crystal display using the same, and more particularly to an edge-type backlight module having a dark surface and a liquid crystal display using the same.

BACKGROUND OF THE INVENTION

The backlight module is a critical component for liquid crystal display (LCD) panels because the liquid crystal does not emit light itself. A backlight module is mainly used for providing a light source with enough brightness and evenly distributed so that an LCD panel can display images normally. As LCD panels are widely used in electronic products such as monitors, notebook computers, digital cameras and projectors, etc., the demands for backlight modules and related components are growing continuously.

Generally speaking, the backlight module is divided into two types, which are the direct-type backlight module and the edge-type backlight module. In the direct-type backlight module, a backlight source, such as a fluorescent lamp, is disposed right under the backlight module. Two or more than two fluorescent lamps can be used for enhancing the brightness of the light source. Therefore, it is suitable for using in a display panel which requires a higher degree of brightness or with a larger size, such as LCD monitors or LCD televisions. On the other hand, in the edge-type backlight module, a light source generator is disposed on a lateral side of a display panel, and the light produced by the light source generator is evenly guided in the display panel by a light guide plate (LGP). Therefore, the size and cost of the liquid crystal display can be reduced. The edge-type backlight module is applied to small sized electrical products.

Figure 1:
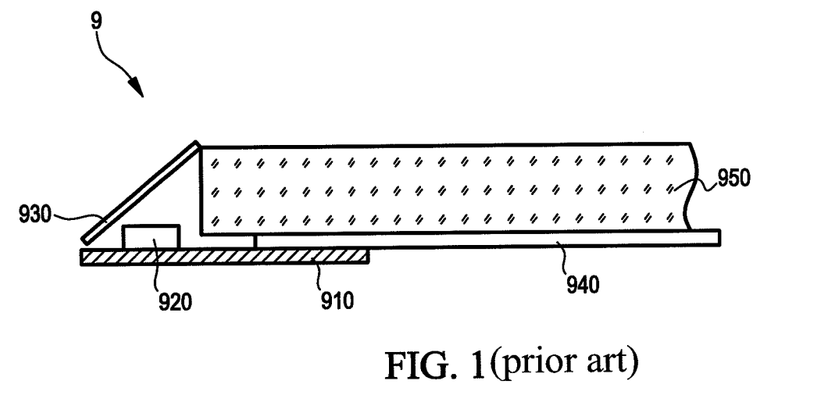
FIG. 1 is a partial perspective view of a conventional edge-type backlight module.

FIG. 1 is an illustration of a conventional edge-type backlight module. An edge-type backlight module 9 comprises a printed circuit board 910, a light emitting diode 920, a reflective film 940, a light guide plate 950 and a reflective surface 930.

The light emitting diode 920 is disposed on a left side of the printed circuit board 910 and the reflective film 940 is disposed on a right side of the printed circuit board 910. The light guide plate 950 is disposed on the reflective film 940 so that the reflective film 940 is disposed between the light guide plate 950 and the printed circuit board 910. The reflective surface 930 is disposed on a side edge of the light guide plate 950 and is kept a distance from the light emitting diode 920. The reflective surface 930 is used for reflecting the light emitted by the light emitting diode 920. In the assembling, because of cutting tolerances of the reflective film 940, assembling tolerances of the reflective film 940, and assembling deviations of the light emitting diode 920, the length of the reflective film 940 is shorter than the length of the light guide plate 950.

Figure 2:
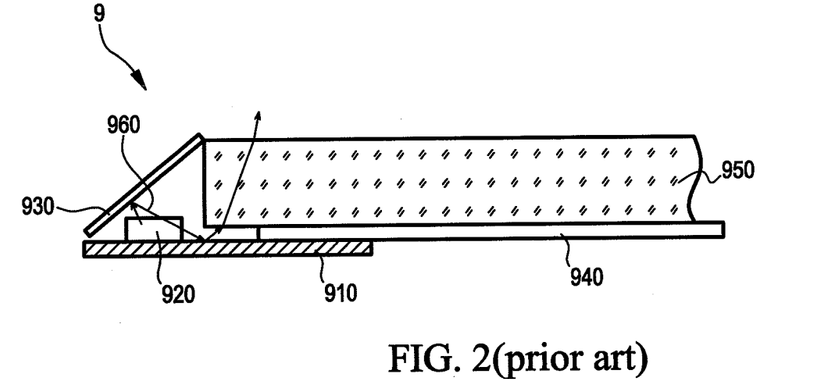
FIG. 2 is a perspective view of the conventional edge-type backlight module and a light path.

FIG. 2 is an illustration of the conventional edge-type backlight module and a light path. When the light emitting diode 920 emits a light beam 960, the light beam 960 is reflected onto the printed circuit board 910 by the reflective surface 930. The light beam 960 is then reflected onto the light guide plate 950 by the printed circuit board 910. Because the light beam 960 entered into the light guide plate 950 does not satisfy the angle of total reflection, the light beam 960 is emitted from the light emitting surface of the light guide plate 950. Therefore, hot spots are occurred which will seriously affect the image quality.

Therefore, in order to solve the above problems, a backlight module and a liquid crystal display using the same are required. The backlight module can reduce light which does not satisfy the angle of total reflection entering into the light guide plate.

SUMMARY OF THE INVENTION

An objective of the present invention is to provide an edge-type backlight module with a new structure which can overcome the drawbacks of the conventional edge-type backlight module. The edge-type backlight module of the present invention can solve the technical problems of hot spots occurred and the seriously affected picture quality caused by light which does not satisfy the angle of total reflection entering into the light guide plate.

Another objective of the present invention is to provide a liquid crystal display using the edge-type backlight module which can overcome the drawbacks of the conventional liquid crystal display. The liquid crystal display using the edge-type backlight module of the present invention can solve the technical problems of hot spots occurred and the seriously affected picture quality caused by light which does not satisfy the angle of total reflection entering into the light guide plate.

In order to achieve the abovementioned objectives, the edge-type backlight module provided by the present invention comprising: a printed circuit board comprising a supporting surface; a plurality of light emitting diodes disposed on a left part of the supporting surface, each of the light emitting diodes comprising a light emitting surface and the light emitted by the light emitting diode being emitted from the light emitting surface; a reflective film disposed on a right part of the supporting surface; a light guide plate disposed above the reflective film so that the reflective film being disposed between the light guide plate and the supporting surface; a reflective surface disposed on a side edge of the light guide plate and being kept a distance from the light emitting diode, the reflective surface being used for reflecting the light emitted by the light emitting surface; and an absorbing surface disposed on the supporting surface and beside the light emitting diode for absorbing the light reflected by the reflective surface.

The absorbing surface of the edge-type backlight module is disposed on the supporting surface and between every two of the adjacent light emitting diodes.

The absorbing surface of the edge-type backlight module is made of a black pigment.

The absorbing surface of the edge-type backlight module is made of a colloid substance or a soft tape. The colors of colloid substance and the soft tape are black color or gray color.

The absorbing surface of the edge-type backlight module is disposed on the supporting surface and between the light emitting diodes and the reflective film. The dark surface is made of a gray thermally conductive tape and a thickness of the thermally conductive tape is equal to or larger than a thickness of the reflective film.

The edge-type backlight module further comprises a locking element penetrating through a right side of the printed circuit board. The locking element is disposed under the reflective film for securing the printed circuit board.

The absorbing surface of the edge-type backlight module further comprising: a first tape disposed between the supporting surface and the reflective film and located beside the light emitting diodes, a width of the first tape being equal to or smaller than a distance from the light emitting diodes to an edge of a right part of the supporting surface, the first tape comprising a hole used to avoid touching with the locking element disposed between the printed circuit board and the reflective film; and a second tape disposed between the light guide plate and the first tape, a width of the second tape being equal to or smaller than a distance from the light emitting diodes to the reflective film, a thickness of the second tape being equal to or larger than a thickness of the reflective film, the second tape is gray.

In order to achieve the abovementioned objectives, the liquid crystal display provided by the present invention comprising: a liquid crystal panel; and an edge-type backlight module for providing a light source to the liquid crystal panel, the edge-type backlight module comprising: a printed circuit board comprising a supporting surface; a plurality of light emitting diodes disposed on a left part of the supporting surface, each of the light emitting diodes comprising an light emitting surface and the light emitted by the light emitting diode being emitted from the light emitting surface; a reflective film disposed on a right part of the supporting surface; a light guide plate disposed above the reflective film so that the reflective film being disposed between the light guide plate and the supporting surface; a reflective surface disposed on a side edge of the light guide plate and being kept a distance from the light emitting diodes, the reflective surface being used for reflecting the light emitted by the light emitting surface; and an absorbing surface disposed on the supporting surface and beside the light emitting diode for absorbing the light reflected by the reflective surface.

As a conclusion from the above, by using the absorbing surface disposed on the supporting surface to absorb the light reflected by the reflective surface, the edge-type backlight module and the liquid crystal display using the same of the present invention can reduce light which does not satisfy the angle of total reflection entering into the light guide plate. Therefore, the hot spots occurred on the liquid crystal panel can be reduced and the picture quality can be enhanced.

The present invention will become more fully understood by reference to the following detailed description thereof when read in conjunction with the attached drawings.

DETAILED DESCRIPTION OF THE INVENTION

Reference will now be made in detail to the preferred embodiment of the present disclosure, examples of which are illustrated in the accompanying drawings.

Figure 3:
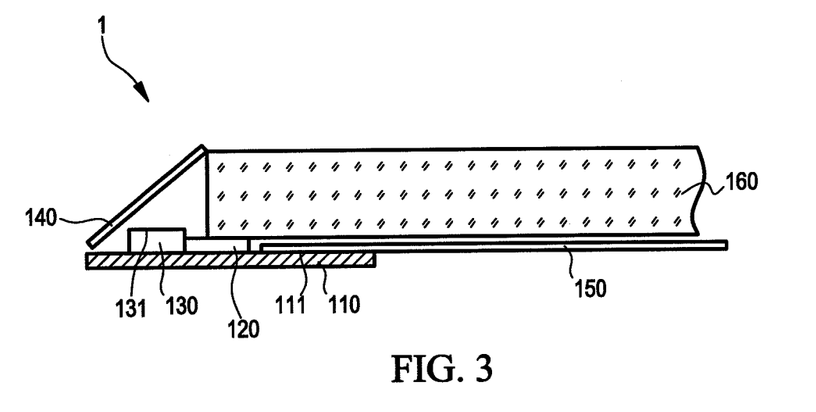
FIG. 3 is a sectional view of a backlight module according to a first embodiment of the present invention.
Figure 4:
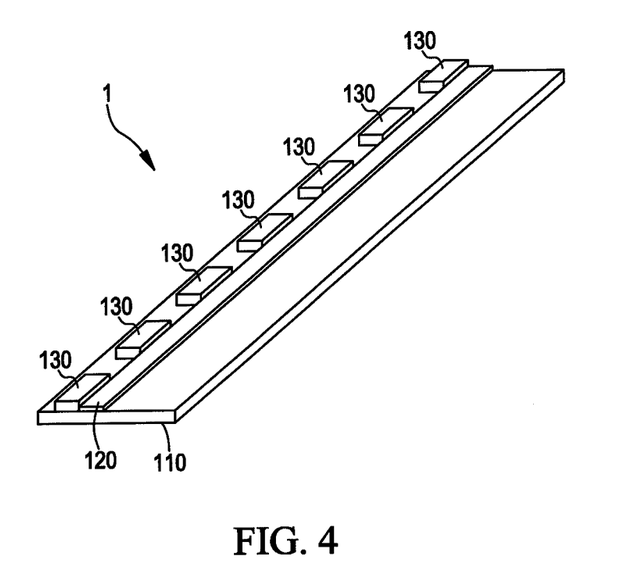
FIG. 4 is a partial perspective view of the backlight module according to the first embodiment of the present invention.

Please refer to FIGS. 3 and 4. FIG. 3 is a sectional view of a backlight module according to a first embodiment of the present invention. FIG. 4 is a partial perspective view of the backlight module according to the first embodiment of the present invention. The backlight module is an edge-type backlight module 1 which comprises a printed circuit board (PCB) 110, a plurality of light emitting diodes (LED) 130, a reflective film 150, a light guide plate (LGP) 160, a reflective surface 140 and an absorbing surface 120. In addition, the printed circuit board 110 comprises a supporting surface 111. Each of the light emitting diodes 130 comprises a light emitting surface 131.

The light emitting diodes 130 are disposed on a left part of the printed circuit board 110 and the reflective film 150 is disposed on a right part of the printed circuit board 110. The absorbing surface 120 is disposed on the supporting surface 111 and between the light emitting diodes 130 and the reflective film 150. The absorbing surface 120 is disposed beside the light emitting diodes 130 for absorbing the light reflected by the reflective surface 140. The absorbing surface 120 can be extended towards the reflective film 150 so that part of the absorbing surface 120 is located between the reflective film 150 and the light guide plate 160. The light guide plate 160 is disposed above the reflective film 150 so that the reflective film 150 is located between the light guide plate 160 and the supporting surface 111. The reflective surface 140 is disposed on a side edge of the light guide plate 160 and is kept a distance from the light emitting diodes 130. The reflective surface 140 is used for reflecting the light emitted from the light emitting surfaces 131 of the light emitting diodes 130. The reflective surface 140 can be formed by bending a plastic frame, a back plate or the reflective film 150, but it is not limited thereto. The absorbing surface 120 can be made of a pigment, a colloid substance, a soft tape or a thermally conductive tape; the color of the absorbing surface 120 can be a black color or a gray color, but is not limited thereto. Because black color is excellent for absorbing light and for presenting as black region on the pictures; white color is excellent for reflecting light and for presenting as bright region on the pictures; therefore, the absorbing surface 120 is preferably gray. In the first embodiment of the present invention, the absorbing surface 120 is a gray thermally conductive tape and the thickness of the thermally conductive tape is equal to or larger than the thickness of the reflective film 150.

Figure 5:
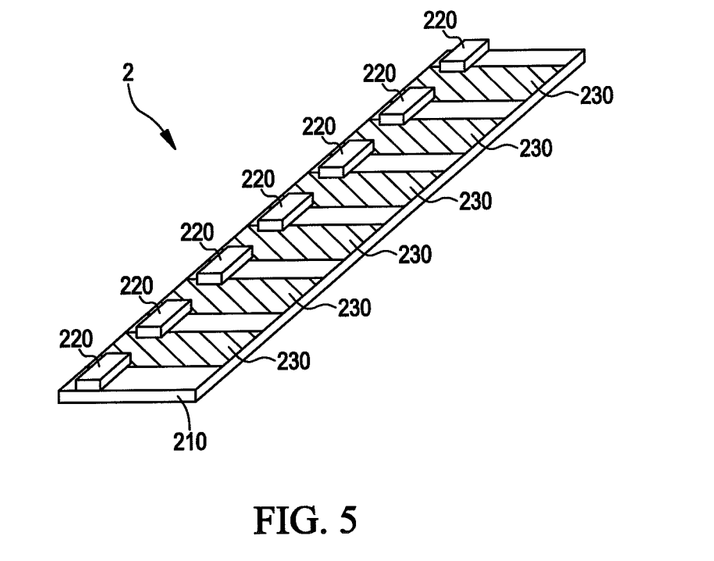
FIG. 5 is a partial perspective view of the backlight module according to a second embodiment of the present invention.

FIG. 5 is a partial perspective view of the backlight module according to a second embodiment of the present invention. The structure of a backlight module 2 is similar to that of the backlight module 1 in the first embodiment which will not be mentioned herein again. The differences between the backlight module 2 and the backlight module 1 in the first embodiment lie in: the disposing position and the material of an absorbing surface 230. The absorbing surface 230 is disposed on a supporting surface of a printed circuit board 210 and located between every two adjacent light emitting diodes 220. The absorbing surface 230 is also closed to the light emitting diodes 220. A length of the absorbing surface 230 is equal to or smaller than a width of the printed circuit board 210. The absorbing surface 230 can be made of a pigment, a colloid substance, a soft tape or a thermally conductive tape; the color of the absorbing surface 230 can be a black color or a gray color, but is not limited thereto. In the second embodiment of the present invention, the absorbing surface 230 is a black pigment.

Figure 6:
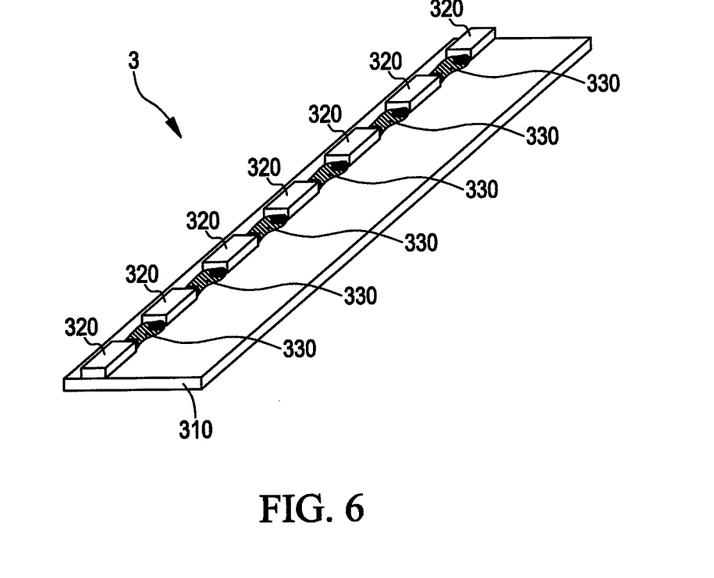
FIG. 6 is a partial perspective view of the backlight module according to a third embodiment of the present invention.

FIG. 6 is a partial perspective view of the backlight module according to a third embodiment of the present invention. The structure of a backlight module 3 is similar to that of the backlight module 1 in the first embodiment which will not be mentioned herein again. The differences between the backlight module 3 and the backlight module 1 in the first embodiment lie in: the disposing position and the material of an absorbing surface 330. The absorbing surface 330 is disposed on a supporting surface of a printed circuit board 310 and located between every two adjacent light emitting diodes 320. The absorbing surface 330 is also closed to the light emitting diodes 320. A length of the absorbing surface 330 is equal to or smaller than a maximum length of the light emitting diode 320 projected on the printed circuit board 310. The absorbing surface 330 can be made of a pigment, a colloid substance, a soft tape or a thermally conductive tape; the color of the dark surface can be a black color or a gray color, but is not limited thereto. In the third embodiment of the present invention, the absorbing surface 330 is a black or gray colloid substance or a soft tape.

Figure 7:
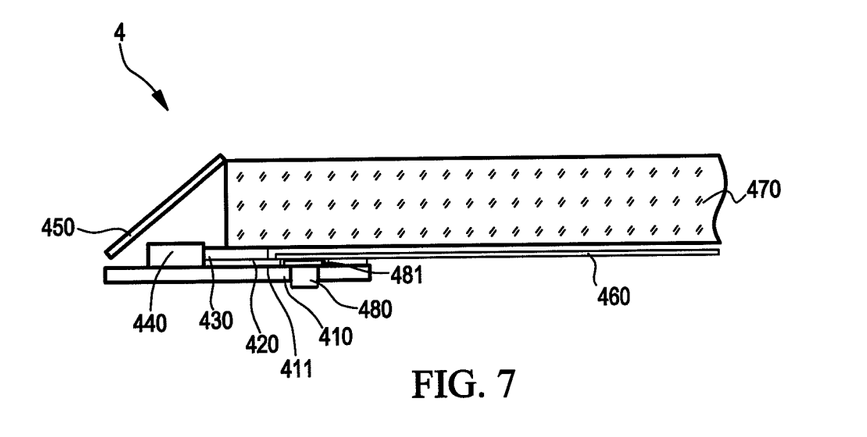
FIG. 7 is a sectional view of the backlight module according to a fourth embodiment of the present invention.
Figure 8:
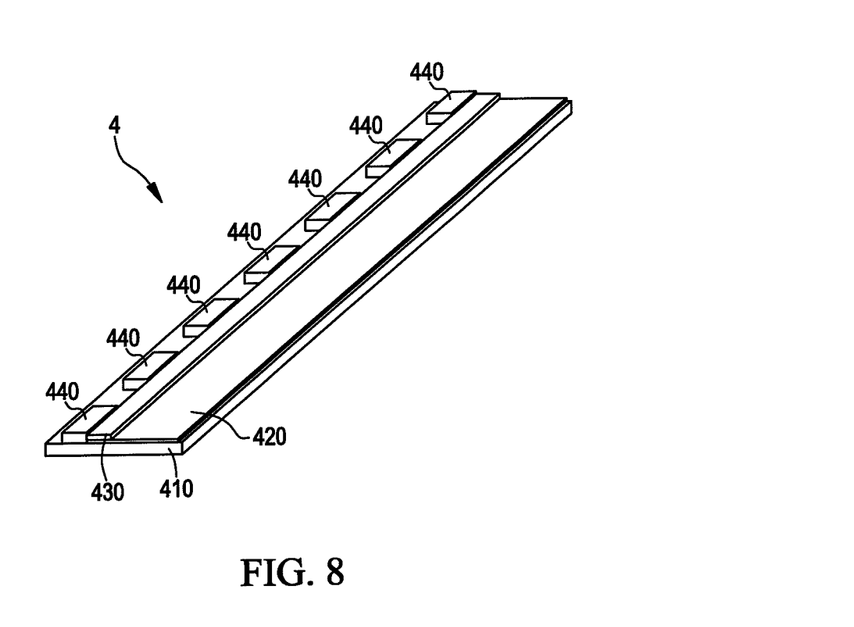
FIG. 8 is a partial perspective view of the backlight module according to the fourth embodiment of the present invention.

Please refer to FIGS. 7 and 8. FIG. 7 is a sectional view of the backlight module according to a fourth embodiment of the present invention. FIG. 8 is a partial perspective view of the backlight module according to the fourth embodiment of the present invention. The backlight module 4 is an edge-type backlight module which comprises a printed circuit board 410, a plurality of light emitting diodes 440, a reflective film 460, a light guide plate 470, a reflective surface 450, a locking element and an absorbing surface. The printed circuit board 410 comprises a supporting surface 411. The locking element is a screw 480 which comprises a nut 481. The absorbing surface comprises a first tape 420 and a second tape 430.

The light emitting diodes 440 are disposed on a left part of the printed circuit board 410 and the reflective film 460 is disposed on a right part of the printed circuit board 410. The first tape 420 is disposed between the supporting surface 411 and the reflective film 460 and located beside the light emitting diode 440. A width of the first tape 420 is equal to or smaller than a distance from the light emitting diode 440 to an edge of a right part of the supporting surface 411. The first tape 420 comprises a hole used to avoid touching with the screw 480 disposed between the printed circuit board 410 and the reflective film 460. The screw 480 penetrates through the first tape 420 and a right side of the printed circuit board 410. The screw 480 is disposed under the reflective film 460 for securing the printed circuit board 410. The light guide plate 470 is disposed above the reflective film 460 so that the reflective film 460 is disposed between the light guide plate 470 and the nut 481. The second tape 430 is disposed between the light guide plate 470 and the first tape 420. A thickness of the second tape 430 is equal to or larger than a thickness of the reflective film 460. The reflective surface 450 is disposed on a side edge of the light guide plate 470 and is kept a distance from the light emitting diodes 440. The reflective surface 450 is used for reflecting the light emitted by the light emitting surfaces of the light emitting diodes 440. In the fourth embodiment of the present invention, the first tape 420 and the second tape 430 are gray.

Figure 9:
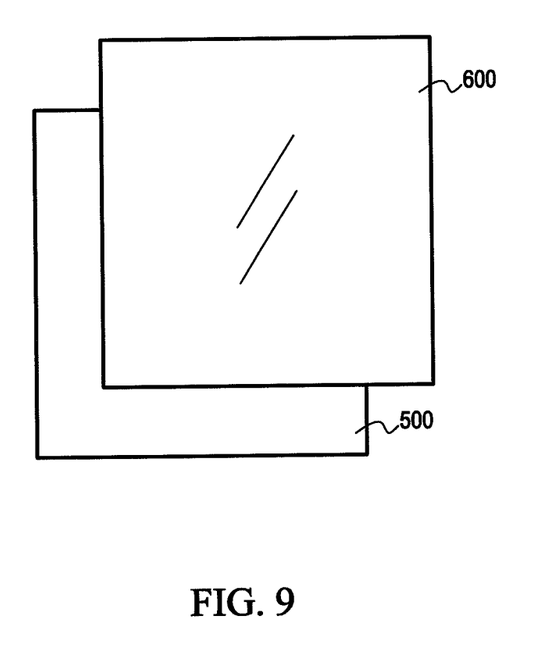
FIG. 9 is an illustration of a liquid crystal display according to a preferred embodiment of the present invention.

FIG. 9 is an illustration of a liquid crystal display according to a preferred embodiment of the present invention. The liquid crystal display comprises a liquid crystal panel 600 and an edge-type backlight module 500. The edge-type backlight module 500 is used for providing a light source to the liquid crystal panel 600 in order to display an image. In the embodiments of the present invention, the edge-type backlight module 500 is the edge-type backlight module disclosed in the first embodiment, the second embodiment, the third embodiment or the fourth embodiment. The liquid crystal display further comprises elements of a plastic frame, a front frame, a back plate, a heat dissipation plate and an optical film. The elements and the related structures are of conventional techniques which will not be mentioned herein.

As a conclusion from the above, by using the dark surface disposed on the supporting surface to absorb the light reflected by the reflective surface, the edge-type backlight module and the liquid crystal display using the same of the present invention can reduce light which does not satisfy the angle of total reflection entering into the light guide plate. Therefore, the hot spots occurred on the liquid crystal panel can be reduced and the picture quality can be enhanced.

Note that the specifications relating to the above embodiments should be construed as exemplary rather than as limitative of the present invention, with many variations and modifications being readily attainable by a person of average skill in the art without departing from the spirit or scope thereof as defined by the appended claims and their legal equivalents.

What is claimed is:
1. An edge-type backlight module, comprising:
a printed circuit board comprising a supporting surface;
a plurality of light emitting diodes disposed on a left part of the supporting surface, each of the light emitting diodes comprising a light emitting surface and light emitted by the light emitting diodes being emitted from the light emitting surface;
a reflective film disposed on a right part of the supporting surface;
a light guide plate disposed above the reflective film so that the reflective film being disposed between the light guide plate and the supporting surface;
a reflective surface disposed on a side edge of the light guide plate and being kept a distance from the light emitting diodes, the reflective surface being used for reflecting the light emitted from the light emitting surface; and
an absorbing surface disposed on the supporting surface and beside the light emitting diodes for absorbing the light reflected by the reflective surface, the absorbing surface is disposed on the supporting surface and between every two of the light emitting diodes adjacent to each other, the absorbing surface is made of a colloid substance, a soft tape or a thermally conductive tape, wherein colors of the colloid substance and the soft tape are black color or gray color, the absorbing surface is disposed on the supporting surface and between the light emitting diodes and the reflective film, a thickness of the thermally conductive tape is equal to or larger than a thickness of the reflective film, the absorbing surface further comprises:
a first tape disposed between the supporting surface and the reflective film and located on a side near the light emitting diodes, a width of the first tape is equal to or smaller than a distance from the light emitting diodes to an edge of a right part of the supporting surface, the first tape comprises a hole used to avoid touching with a locking element disposed between the printed circuit board and the reflective film;
a second tape disposed between the light guide plate and the first tape, a width of the second tape is equal to or smaller than a distance from the light emitting diodes to the reflective film, a thickness of the second tape is equal to or larger than a thickness of the reflective film, the second tape is gray; and
the locking element penetrating through a right side of the printed circuit board and disposed under the reflective film for securing the printed circuit board.

2. An edge-type backlight module, comprising:
a printed circuit board comprising a supporting surface;
a plurality of light emitting diodes disposed on a left part of the supporting surface, each of the light emitting diodes comprising an light emitting surface and light emitted by the light emitting diodes being emitted from the light emitting surface;
a reflective film disposed on a right part of the supporting surface;
a light guide plate disposed above the reflective film so that the reflective film being disposed between the light guide plate and the supporting surface;
a reflective surface disposed on a side edge of the light guide plate and being kept a distance from the light emitting diodes, the reflective surface being used for reflecting the light emitted from the light emitting surface; and
an absorbing surface disposed on the supporting surface and beside the light emitting diodes for absorbing the light reflected by the reflective surface,
wherein the edge-type backlight module further comprises a locking element penetrating through a right side of the printed circuit board, the locking element being disposed under the reflective film for securing the printed circuit board, and
wherein the absorbing surface further comprises a first tape disposed between the supporting surface and the reflective film and located on a side near the light emitting diodes, a width of the first tape is equal to or smaller than a distance from the light emitting diodes to an edge of a right part of the supporting surface, the first tape comprises a hole used to avoid touching with the locking element disposed between the printed circuit board and the reflective film; and a second tape disposed between the light guide plate and the first tape, a width of the second tape is equal to or smaller than a distance from the light emitting diodes to the reflective film, a thickness of the second tape is equal to or larger than a thickness of the reflective film.

3. The edge-type backlight module as claimed in claim 2, wherein the absorbing surface is disposed on the supporting surface and between every two of the light emitting diodes adjacent to each other.

4. The edge-type backlight module as claimed in claim 3, wherein the absorbing surface is made of a black pigment.

5. The edge-type backlight module as claimed in claim 3, wherein the absorbing surface is made of a colloid substance or a soft tape, wherein colors of the colloid substance and the soft tape are black color or gray color.

6. The edge-type backlight module as claimed in claim 2, wherein the absorbing surface is disposed on the supporting surface and between the light emitting diodes and the reflective film.

7. The edge-type backlight module as claimed in claim 6, wherein the absorbing surface is made of a gray thermally conductive tape and a thickness of the thermally conductive tape is equal to or larger than a thickness of the reflective film.

8. The edge-type backlight module as claimed in claim 2, wherein the second tape is gray.

9. A liquid crystal display, comprising:
a liquid crystal panel; and
an edge-type backlight module for providing a light source to the liquid crystal panel, the edge-type backlight module comprising:
a printed circuit board comprising a supporting surface;
a plurality of light emitting diodes disposed on a left part of the supporting surface, each of the light emitting diodes comprising a light emitting surface and light emitted by the light emitting diodes being emitted from the light emitting surface;
a reflective film disposed on a right part of the supporting surface;
a light guide plate disposed above the reflective film so that the reflective film being disposed between the light guide plate and the supporting surface;
a reflective surface disposed on a side edge of the light guide plate and being kept a distance from the light emitting diodes, the reflective surface being used for reflecting the light emitted by the light emitting surface; and
an absorbing surface disposed on the supporting surface and beside the light emitting diodes for absorbing the light reflected by the reflective surface,
wherein the edge-type backlight module further comprises a locking element penetrating through a right side of the printed circuit board, the locking element being disposed under the reflective film for securing the printed circuit board, and
wherein the absorbing surface further comprises a first tape disposed between the supporting surface and the reflective film and located on a side near the light emitting diodes, a width of the first tape is equal to or smaller than a distance from the light emitting diodes to an edge of a right part of the supporting surface, the first tape comprises a hole used to avoid touching with the locking element disposed between the printed circuit board and the reflective film; and a second tape disposed between the light guide plate and the first tape, a width of the second tape is equal to or smaller than a distance from the light emitting diodes to the reflective film, a thickness of the second tape is equal to or larger than a thickness of the reflective film.

\* \* \* \* \*